(12) United States Patent
Bougaev et al.

(10) Patent No.: US 8,051,728 B2
(45) Date of Patent: Nov. 8, 2011

(54) MONITORING A CONNECTION IN A COMPUTER SYSTEM

(75) Inventors: Anton A. Bougaev, La Jolla, CA (US); Aleksey M. Urmanov, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 785 days.

(21) Appl. No.: 12/127,257

(22) Filed: May 27, 2008

(65) Prior Publication Data

US 2009/0300244 A1 Dec. 3, 2009

(51) Int. Cl.
*G01N 19/00* (2006.01)
(52) U.S. Cl. ..................................... 73/865.9
(58) Field of Classification Search ............... 73/865.9; 340/540, 635, 669, 686.6, 687
See application file for complete search history.

(56) References Cited

U.S. PATENT DOCUMENTS

| 6,768,314 | B2 * | 7/2004 | Shimizu et al. | 324/538 |
| 7,066,039 | B1 * | 6/2006 | Orlogi et al. | 73/865.9 |
| 7,305,714 | B2 * | 12/2007 | Hamaguchi et al. | 726/34 |
| 7,352,284 | B2 * | 4/2008 | Krill | 340/545.1 |
| 7,580,695 | B2 * | 8/2009 | Sabram | 455/343.1 |
| 7,606,552 | B2 * | 10/2009 | Orr et al. | 455/343.1 |
| 7,646,299 | B2 * | 1/2010 | Krill | 340/545.1 |
| 7,684,949 | B2 * | 3/2010 | Koerner | 702/117 |
| 7,782,201 | B2 * | 8/2010 | Weksler et al. | 340/568.1 |

* cited by examiner

*Primary Examiner* — Helen C. Kwok
(74) *Attorney, Agent, or Firm* — Park, Vaughan, Fleming & Dowler LLP

(57) ABSTRACT

Some embodiments of the present invention provide a system that monitors a connection in a computer system between a connector and a component coupled to the connector. During operation, a first motion parameter of the connector, and a second motion parameter of the component are measured. Then, the connection is monitored by comparing information related to the first motion parameter and information related to the second motion parameter.

20 Claims, 2 Drawing Sheets

MONITORING A CONNECTION IN A COMPUTER SYSTEM

BACKGROUND

1. Field

The present invention relates to techniques for monitoring the performance of computer systems. More specifically, the present invention relates to a method and apparatus for monitoring a connection in a computer system between a connector and a component.

2. Related Art

In computer systems, the quality of the electrical contact between a component and a connector it is inserted into is important for signal integrity and potentially proper operation of the computer system as a whole. Wear-out of a connection can cause failures that can potentially lead to computer system errors, unplanned downtime and even loss of data.

Vibration can significantly accelerate the wear-out mechanisms. For example, in the presence of excessive vibration, the motion of connector pins may result in the accumulation of debris that is not removed and as a result can cause an increase in the resistivity of the connection or even in a complete open circuit. Although the wear-out of a connection is inevitable due to electrical and environmental factors, connections are typically design so that there will not be any noticeable effects of wear until after the planned life cycle of the computer system has ended. However, as new generations of computer systems are built that require more cooling, vibrations from the more powerful cooling fans can cause premature wear-out of a connection.

Hence what is needed is a method and system that monitors a connection in a computer system.

SUMMARY

Some embodiments of the present invention provide a system that monitors a connection in a computer system between a connector and a component coupled to the connector. During operation, a first motion parameter of the connector and a second motion parameter of the component are measured. Then, the connection is monitored by comparing information related to the first motion parameter and information related to the second motion parameter.

In some embodiments, at least one of the first motion parameter and the second motion parameter includes an acceleration.

In some embodiments, the connector includes an electrical connector.

In some embodiments, monitoring the connection includes monitoring a relative motion of the connector and the component based on the first motion parameter and the second motion parameter.

In some embodiments, monitoring the connection includes monitoring a relative acceleration of the connector and the component based on the first motion parameter and the second motion parameter.

In some embodiments, monitoring the connection includes monitoring an accumulated root-mean square of a relative displacement of the connector and the component based on the first motion parameter and the second motion parameter.

In some embodiments, monitoring the connection includes generating a parameter related to a mean time to failure for the connection based on the accumulated root-mean square of the relative displacement.

In some embodiments, an alarm is generated when the mean time to failure crosses a predetermined threshold.

Some embodiments of the present invention provide a system that monitors a connection in a computer system between a connector and a component coupled to the connector. During operation a relative motion of the connector and the component are measured. The connection is monitored based on information related to the relative motion of the connector and the component coupled to the connector.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
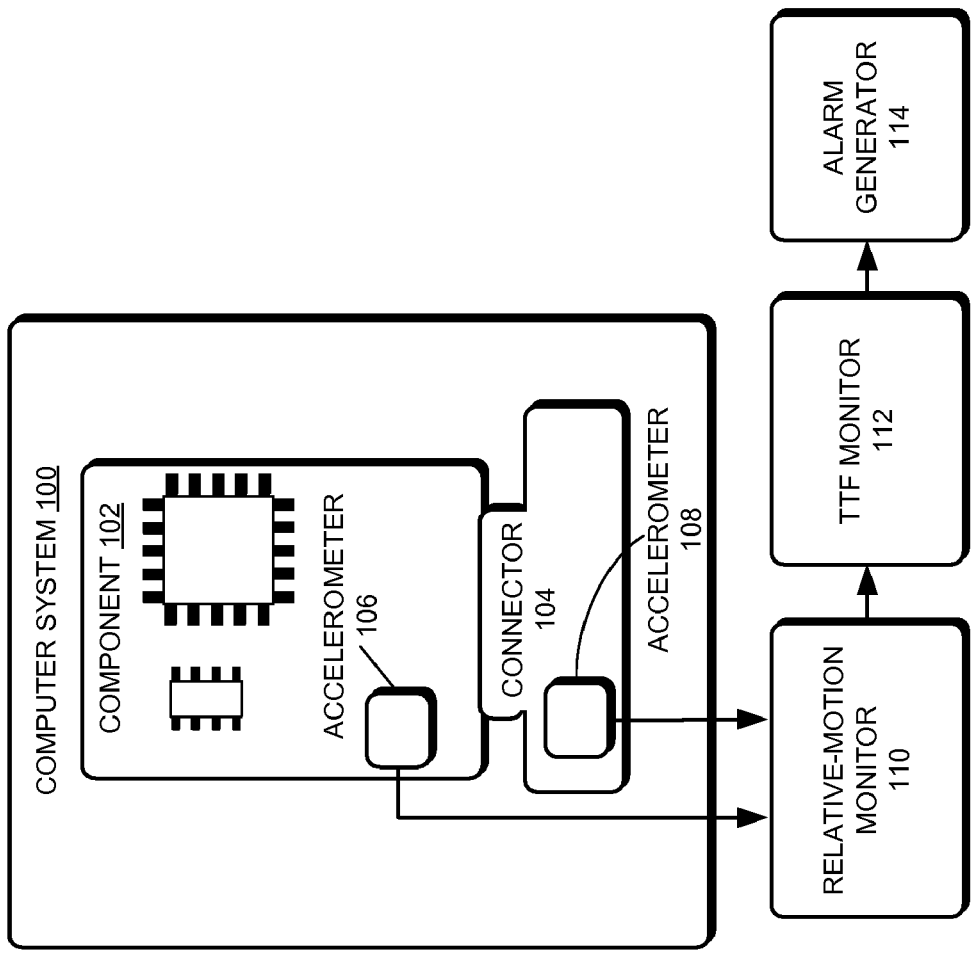
FIG. 1 represents a system that monitors a connection in a computer system in accordance with some embodiments of the present invention.

FIG. 1 represents a system that monitors a connection in a computer system in accordance with some embodiments of the present invention. Computer system 100 includes component 102 coupled to connector 104. Accelerometer 106 is coupled to component 102 and accelerometer 108 is coupled to connector 104. Relative-motion monitor 110 is coupled to accelerometer 106, accelerometer 108, and time-to-failure (TTF) monitor 112. TTF monitor 112 is coupled to alarm generator 114.

Computer system 100 can include but is not limited to a server, server blade, a datacenter server, an enterprise computer, a field-replaceable unit that includes a processor, or any other computation system that includes one or more processors and one or more cores in each processor.

Component 102 can include but is not limited to any board, device (including a disk drive), sub-system, or portion of a computer system that is coupled to a connector to form a connection. Connector 104 can be any type of connector in a computer system including but not limited to detachable electrical and mechanical connectors, for example a socket connector, or permanent electrical connector.

Accelerometer 106 is coupled to component 102 and measures its acceleration. Accelerometer 108 is coupled to connector 104 and measures its acceleration. In some embodiments, accelerometer 108 is coupled to a component in computer system 100, other than component 102, to which connector 104 is coupled. For example, in some embodiments, connector 104 is mounted on a printed circuit board (PCB) in computer system 100 and accelerometer 108 is attached to the PCB. Then, as connector 104 moves, accelerometer 108 will detect the acceleration of the PCB which is related to the acceleration of connector 104 attached to the PCB.

Accelerometer 106 and accelerometer 108 can include but are not limited to integrated electronics piezoelectric accelerometers, micro-electromechanical (MEMS) accelerometers, mechanical or optical accelerometers, remote sensing devices, or any other device or system that can measure acceleration of a specified location.

Relative-motion monitor 110 can be any device that can receive input from accelerometer 106 and accelerometer 108 and monitor the relative motion between them. Relative-motion monitor 110 can be implemented in any combination of hardware and software. In some embodiments, relative-motion monitor 110 operates on computer system 100. In other embodiments, relative-motion monitor 110 operates on one or more service processors. In still other embodiments, relative-motion monitor 110 is located inside computer system 100. In yet other embodiments, relative-motion monitor 110 operates on a separate computer system. In some embodiments, relative-motion monitor 110 includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference, and information generated by relative-motion monitor 110 is recorded as a performance parameter of computer system 100

TTF monitor 112 can be any device that can receive input from relative-motion monitor 110 and generate a time-to-failure (TTF) for the connection between component 102 and connector 104. TTF monitor 112 can be implemented in any combination of hardware and software. In some embodiments, TTF monitor 112 operates on computer system 100. In other embodiments, TTF monitor 112 operates on one or more service processors. In still other embodiments, TTF monitor 112 is located inside computer system 100. In yet other embodiments, TTF monitor 112 operates on a separate computer system. In other embodiments TTF monitor 112 operates on the same hardware as relative-motion monitor 110. In some embodiments, TTF monitor 112 includes a method or apparatus for monitoring and recording computer system performance parameters as set forth in U.S. Pat. No. 7,020,802, and information generated by TTF monitor 112 is recorded as a performance parameter of computer system 100.

Alarm generator 114 can be any device that can receive input from TTF monitor 112 and generate an alarm if the TTF generated by TTF monitor 112 falls below a predetermined value. Alarm generator 114 can be implemented in any combination of hardware and software. In some embodiments, alarm generator 114 operates on computer system 100. In other embodiments, alarm generator 114 operates on one or more service processors. In still other embodiments, alarm generator 114 is located inside computer system 100. In yet other embodiments, alarm generator 114 operates on a separate computer system. In other embodiments alarm generator 114 operates on the same hardware as relative-motion monitor 110 and/or TTF monitor 112. In some embodiments, alarm generator 114 includes a method or apparatus for monitoring and recording computer system performance parameters as set forth in U.S. Pat. No. 7,020,802, and information generated by alarm generator 114 is recorded as a performance parameter of computer system 100.

Some embodiments operate as follows. Accelerometer 106 sends a signal to relative-motion monitor 110 related to the acceleration of component 102 and accelerometer 108 sends a signal to relative-motion monitor 110 related to the acceleration of connector 104. It is noted that in some embodiments, accelerometer 106 and accelerometer 108 can each be replaced by multiple accelerometers and the signals averaged to reduce noise.

Relative-motion monitor 110 then uses the signals from accelerometer 106 and accelerometer 108 to determine a relative motion between component 102 and connector 104. Relative-motion monitor 110 can determine the relative motion of component 102 and connector 104 from the acceleration signals from accelerometer 106 and accelerometer 108 using well known methods. In some embodiments, the relative motion is determined by first determining the difference in acceleration measured by accelerometer 106 and accelerometer 108. The relative acceleration is then converted in to a relative displacement using well known methods including but not limited to analog integration in the time domain, filtering, numeric integration in the time domain, numeric integration in the frequency domain (including omega arithmetic), or any other method known to those of ordinary skill in the art. It is noted that in some embodiments, if numeric integration in the frequency domain is used, then a 1/f noise cutoff is used to reduce low frequency noise.

In some embodiments, the displacement is determined for each accelerometer using the methods described above and then the relative displacement of the two accelerometers is determined by determining the difference in displacement between the two accelerometers.

In some embodiments, the signals from accelerometer 106 and accelerometer 108 are each sent through a low pass filter with a predetermined cut-off frequency to account for sampling rate and accelerometer characteristics. For example if the sampling rate of the accelerometers is 5,000 samples per second, the predetermined cut-off frequency can be 2,500 hertz.

The relative motion determined by relative-motion monitor 110 is then output to TTF monitor 112. TTF monitor 112 then accumulates information related to the relative displacement between component 102 and connector 104 over time. In some embodiments, TTF monitor 112 accumulates the root-mean square (RMS) value of the relative displacement over time according to equation 1. In equation 1, TM(n) is the total accumulated RMS relative displacement called "Total Mileage" for the nth time period, RD(n) is the relative displacement for the nth time period calculated as described above, and RMS(RD(n)) is the RMS value of RD(n).

$$TM(n)=TM(n-1)+RMS(RD(n)) \quad (1)$$

In some embodiments, the total mileage of a connection is correlated with the wear-out (W) of the connection between component 102 and connector 104. The correlation can be determined through testing of connections, for example using highly accelerated lifetime testing (HALT) in which a number of connectors connected to components are placed in a controlled environment and subject to vibration. A model is then generated that relates the "total mileage" of the connection to the wear-out of the connection and to the probability of a fault, failure, or other anomaly in the connection that it is desired to be detected by the embodiments of the invention.

Equation 2 shows that relationship between wear-out (W) of the connection and the "total mileage" though the function F determined as discussed above.

$$W = F(TM) \quad (2)$$

The testing described above can also be used to find a function G that gives the probability that a TTF for a connection is less than a predetermined time t for a given wear-out W as shown in equation 3.

$$\text{Prob}(TTF < t) = G(t, W) \quad (3)$$

Also, a function H can be obtained from the testing described above that produces a point value of the TTF, for example a mean time to failure (MTTF) as shown in equation 4.

$$TTF = H(\text{Prob}(TTF < t), \text{confidence}) \quad (4)$$

TTF monitor 112 then sends a signal to alarm generator 114. Alarm generator 114 then generates an alarm when the time to failure falls below a predetermined threshold value. Then alarm can include but is not limited to sending a signal or message to warn of failure of the connection between connector 102 and component 104, schedule servicing for the connection, or to take any other action desired when it is determined that the TTF for the connection has fallen below a predetermined level. It is noted that wear-out of a connection can include wear-out of any part of the connection between the connector and the component that can or does cause a fault, failure, or other anomaly in the connection that it is desired to be detected by embodiments of the invention.

It is noted that TM is generated using the relative displacement between component 102 and connector 104 and therefore in embodiments of the invention accelerometer 106 and accelerometer 108 can each be replaced by any device that can measure a motion parameter that can be used to determine a relative displacement between component 102 and connector 104. In some embodiments, accelerometer 106 and accelerometer 108 can each be replace by displacement sensors and the relative displacement is then determined by finding the difference between the displacements measured by each displacement sensor. In other embodiments, both accelerometer 106 and accelerometer 108 can be replaced by a single device that measures a relative displacement between component 102 and connector 104. In some embodiment, a strain gauge is coupled to component 102 and connector 104 so that a relative motion between component 102 and connector 104 is measured as a strain by the strain gauge. The strain measured by the strain gauge is then converted to a relative motion between component 102 and connector 104 using a pre-specified or experimentally determined relationship between strain measured by the strain gauge and relative motion of the strain gauge. The measured relative motion can then be input into TTF monitor 112.

Figure 2:
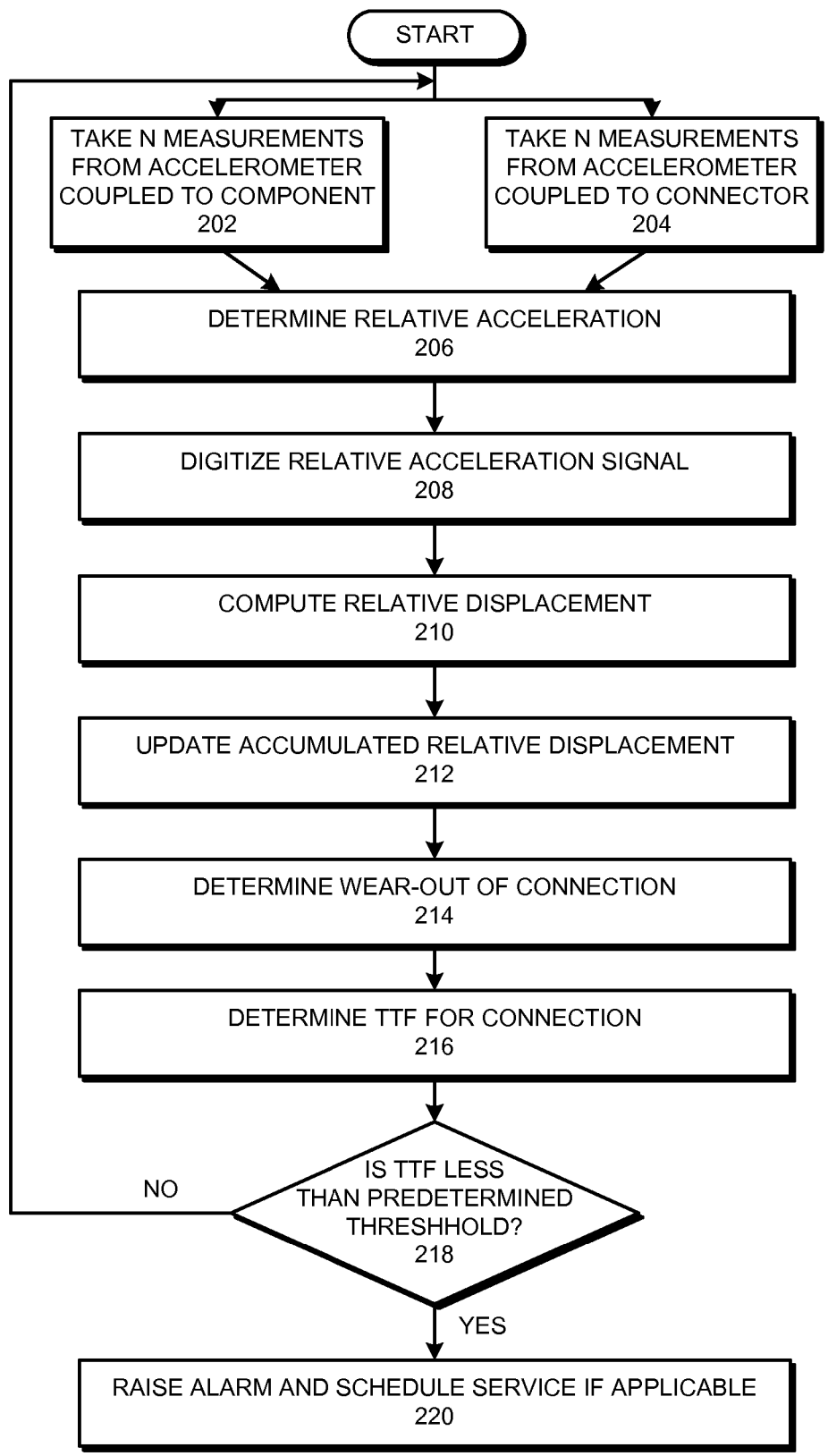
FIG. 2 presents a flowchart illustrating a process for monitoring a connection in a computer system in accordance with some embodiments of the present invention.

FIG. 2 presents a flowchart illustrating a process for monitoring a connection in a computer system in accordance with some embodiments of the present invention. First, N acceleration measurements are taken from an accelerometer coupled to a component in a computer system (step 202). Then, N acceleration measurements are taken from an accelerometer coupled to a connector into which the component is connected (step 204). The relative acceleration of the two accelerometers is then determined (step 206) by, for example, subtracting the acceleration measured in step 202 from the acceleration measure in step 204. The relative acceleration is then digitized (step 208). The relative displacement is then determined from the relative acceleration using any method desired (step 210), including but not limited to integrating the relative acceleration signal twice, using omega arithmetic, or any other method known to those of ordinary skill in the art.

The accumulated relative displacement is then updated (step 212). The accumulated relative displacement or "total mileage" can be calculated using equation 1 above. The wear-out of the connection is then determined (step 214). The wear-out can be determined as described above with reference to equation 2. The TTF is then determined (step 216). The time to failure can be determined as described above with reference to equations 3 and 4.

Then, if the TTF is less than a predetermined threshold (step 218) an alarm is generated and service is scheduled if applicable (step 220). If the TTF is not less than a predetermined threshold (step 218) then the process returns to steps 202 and 204.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for monitoring a connection in a computer system between a connector and a component coupled to the connector, the method comprising:
    measuring a first motion parameter of the connector;
    measuring a second motion parameter of the component; and
    monitoring the connection by comparing information related to the first motion parameter and information related to the second motion parameter.

2. The method of claim 1, wherein at least one of the first motion parameter and the second motion parameter includes an acceleration.

3. The method of claim 1, wherein the connector includes an electrical connector.

4. The method of claim 1, wherein:
    monitoring the connection includes monitoring a relative motion of the connector and the component based on the first motion parameter and the second motion parameter.

5. The method of claim 1, wherein:
    monitoring the connection includes monitoring a relative acceleration of the connector and the component based on the first motion parameter and the second motion parameter.

6. The method of claim 1, wherein:
    monitoring the connection includes monitoring an accumulated root-mean square of a relative displacement of the connector and the component based on the first motion parameter and the second motion parameter.

7. The method of claim 6, wherein:
    monitoring the connection includes generating a parameter related to a mean time to failure for the connection based on the accumulated root-mean square of the relative displacement.

8. The method of claim 7 wherein an alarm is generated when the mean time to failure crosses a predetermined threshold.

9. A computer-readable storage medium storing instructions that when executed by a computer cause the computer to perform a method for monitoring a connection in a computer system between a connector and a component coupled to the connector, the method comprising:

measuring a first motion parameter of the connector;
measuring a second motion parameter of the component; and
monitoring the connection by comparing information related to the first motion parameter and information related to the second motion parameter.

10. The computer-readable storage medium of claim 9, wherein at least one of the first motion parameter and the second motion parameter includes an acceleration.

11. The computer-readable storage medium of claim 9, wherein the connector includes an electrical connector.

12. The computer-readable storage medium of claim 9, wherein:
monitoring the connection includes monitoring a relative motion of the connector and the component based on the first motion parameter and the second motion parameter.

13. The computer-readable storage medium of claim 9, wherein:
monitoring the connection includes monitoring a relative acceleration of the connector and the component based on the first motion parameter and the second motion parameter.

14. The computer-readable storage medium of claim 9, wherein:
monitoring the connection includes monitoring an accumulated root-mean square of a relative displacement of the connector and the component based on the first motion parameter and the second motion parameter.

15. The computer-readable storage medium of claim 14, wherein:
monitoring the connection includes generating a parameter related to a mean time to failure for the connection based on the accumulated root-mean square of the relative displacement.

16. The computer-readable storage medium of claim 15 wherein an alarm is generated when the mean time to failure crosses a predetermined threshold.

17. An apparatus for monitoring a connection in a computer system between a connector and a component coupled to the connector, comprising:
a first measuring mechanism configured to measure a first motion parameter of the connector;
a second measuring mechanism configured to measure a second motion parameter of the component; and
a monitoring mechanism configured to monitor the connection by comparing information related to the first motion parameter and information related to the second motion parameter.

18. The apparatus of claim 17, wherein:
the monitoring mechanism is further configured to monitor an accumulated root-mean square of a relative displacement of the connector and the component based on the first motion parameter and the second motion parameter.

19. The apparatus of claim 18, wherein:
the monitoring mechanism is further configured to generate a parameter related to a mean time to failure for the connection based on the accumulated root-mean square of the relative displacement.

20. A method for monitoring a connection in a computer system between a connector and a component coupled to the connector, the method comprising:
measuring a relative motion of the connector and the component; and
monitoring the connection based on information related to the relative motion of the connector and the component coupled to the connector, wherein monitoring the connection comprises generating a time-to-failure (TTF) for the connection based on the information related to the relative motion of the connector and the component.

* * * * *